June 24, 1958 F. COOPER ET AL 2,840,798

MAGNETIC STORAGE SYSTEM

Filed Feb. 19, 1952 5 Sheets-Sheet 1

INVENTORS:
FRANK COOPER
HARRY MALBON
ATTORNEYS:
Morse & Hall

June 24, 1958 F. COOPER ET AL 2,840,798

MAGNETIC STORAGE SYSTEM

Filed Feb. 19, 1952 5 Sheets-Sheet 2

INVENTORS:
F. COOPER
H. MALBON
ATTORNEYS:
Moore & Hall

June 24, 1958 F. COOPER ET AL 2,840,798

MAGNETIC STORAGE SYSTEM

Filed Feb. 19, 1952 5 Sheets-Sheet 3

INVENTORS:
F. COOPER
H. MALBON
ATTORNEYS:
Morrow & Hall

INVENTORS:
F. COOPER
H. MALBON
ATTORNEYS:
Moore & Hall

INVENTORS:
F. COOPER
H. MALBON
ATTORNEYS:
Moore & Hall

United States Patent Office 2,840,798

Patented June 24, 1958

2,840,798

MAGNETIC STORAGE SYSTEM

Frank Cooper and Harry Malbon, Hollinwood, England, assignors to National Research Development Corporation, London, England, a British corporation

Application February 19, 1952, Serial No. 272,476

Claims priority, application Great Britain February 27, 1951

15 Claims. (Cl. 340—174)

This invention relates to magnetic storage systems for the recording and subsequent reproduction of electric signals, more particularly electric pulse signal trains such as are employed in certain forms of electric digital computing machines. Examples of such machines are those described in the paper entitled "Universal High-Speed Digital Computers: A small scale experimental machine," by F. C. Williams, T. Kilburn and G. C. Tootill, published in the Proceedings of the Institution of Electrical Engineers (London), vol. 98, part II, February 1951, pages 13 to 28 and also in copending patent applications Nos. 141,176, 165,434 and 226,761. An example of a form of magnetic recording suitable for use with such machines is that described in copending patent application No. 146,446.

In general, the magnetic recording of any such pulse signals is effected by abruptly changing the magnetisation state of a small area of an elongated recording track which is moved relatively to an electromagnetic write head having a magnetic flux gap closely adjacent to such track whereby at least a part of the flux bridging such gap passes through the track and influences its state of magnetisation. Reproduction is effected in converse manner with the aid of a separate electromagnetic read head having an output winding interlinked by the varying magnetic flux derived from the recording track.

In electric digital computing machines of the kind in which numbers or instructions are represented serially in dynamic form by such electric pulse signal trains it is imperative that any pulse signals derived from the magnetic storage device should be in exact synchronism with the related digit-interval of the word period or beat in the operating rhythm of the machine. The initial writing-in or recording of information- or number-words is effected by pulse signals which occur in the digit-intervals of such operating rhythm in according with their value of significance, e. g. in a binary digital computing machine in accordance with the particular power of 2 which they are to signal. The magnetic recording operation, however, inherently produces some degree of phase delay whereby the actual magnetic disturbance of the track itself lags behind the timing of the initiating signal. There may be further delays in reconverting such magnetic recording back into an electric signal during the subsequent reading operation and as such signal must occur in the digit-interval of the same significance of a word period in the operating rhythm of the machine it is necessary to use a separate read head and to place such read head at a physical position which is located ahead of the write head, relative to the direction of movement of the track, by an amount which will bring the eventually-reproduced signal which is read out from the track into time-coincidence with the related digit-interval in the operating rhythm of the machine.

As the linear dimension measured along the track occupied by each digit signal recording is extremely small, for example, it may be of the order of .007 inch only, it will be clear the physical separation between the effective centres of the read and write heads of a track must be very accurately maintained if the required accuracy of timing of the input and output signals is to be achieved. With the example previously quoted errors of the order of .0001 inches in such spacing distance can produce phase errors of considerable magnitude between the timing of the input and output signals.

The above described difficulties are accentuated when, as is necessary with any practical form of magnetic store, a large number of recording tracks, each with its own pair of write and read heads, are used and any one of which is required to be selected and operated in conjunction with the associated machine.

The object of the present invention is to provide an improved and relatively simple arrangement by which an adjustment of circuit parameters provides an equivalent to the required adjustment of physical spacing distance between the read and write heads.

In accordance with the present invention means are provided for adjusting the proportion of the available energizing pulse signal current which is actually applied to the recording or write heads so that, by reason of the inherently sloping wave front of such signal and the nature of the B/H curve of the magnetic recording medium, the instant at which the abrupt change of state of magnetisation of the recording track takes place, relative to the commencement of the initiating pulse signal, may be varied with the result that the subsequently read-out signal is correspondingly altered in its timing relative to the operating rhythm of the machine.

In a preferred embodiment of the invention this adjustment is effected by means of attenuation networks connected in the primary circuits of each of the step-down transformers which are individual to each write head of the recording device.

The nature of the invention will be better understood from the following brief description of one embodiment given in conjunction with the accompanying drawings in which:

Fig. 1 is a schematic diagram illustrating certain elements of an electronic digital computer incorporating a magnetic storage device.

Fig. 2 comprises a series of electric waveform diagrams of operating and controlling potentials existing within the device of Fig. 1.

Figs 3(*a*), (*b*), (*c*) and (*d*) show details the recording head.

The embodiment of the invention being described is one adapted for use with the magnetic recording system described in detail in the specification of copending patent application No. 146,446 in which a signal of one of two kinds, e. g. a signal representing the binary digit "0," is represented by the reversal of the orientation of magnetism in the track from a first direction to a second direction and in which a signal of the other kind, e. g. representing the binary digit "1," is represented by a reversal from said second direction to said first direction.

Figure 1:
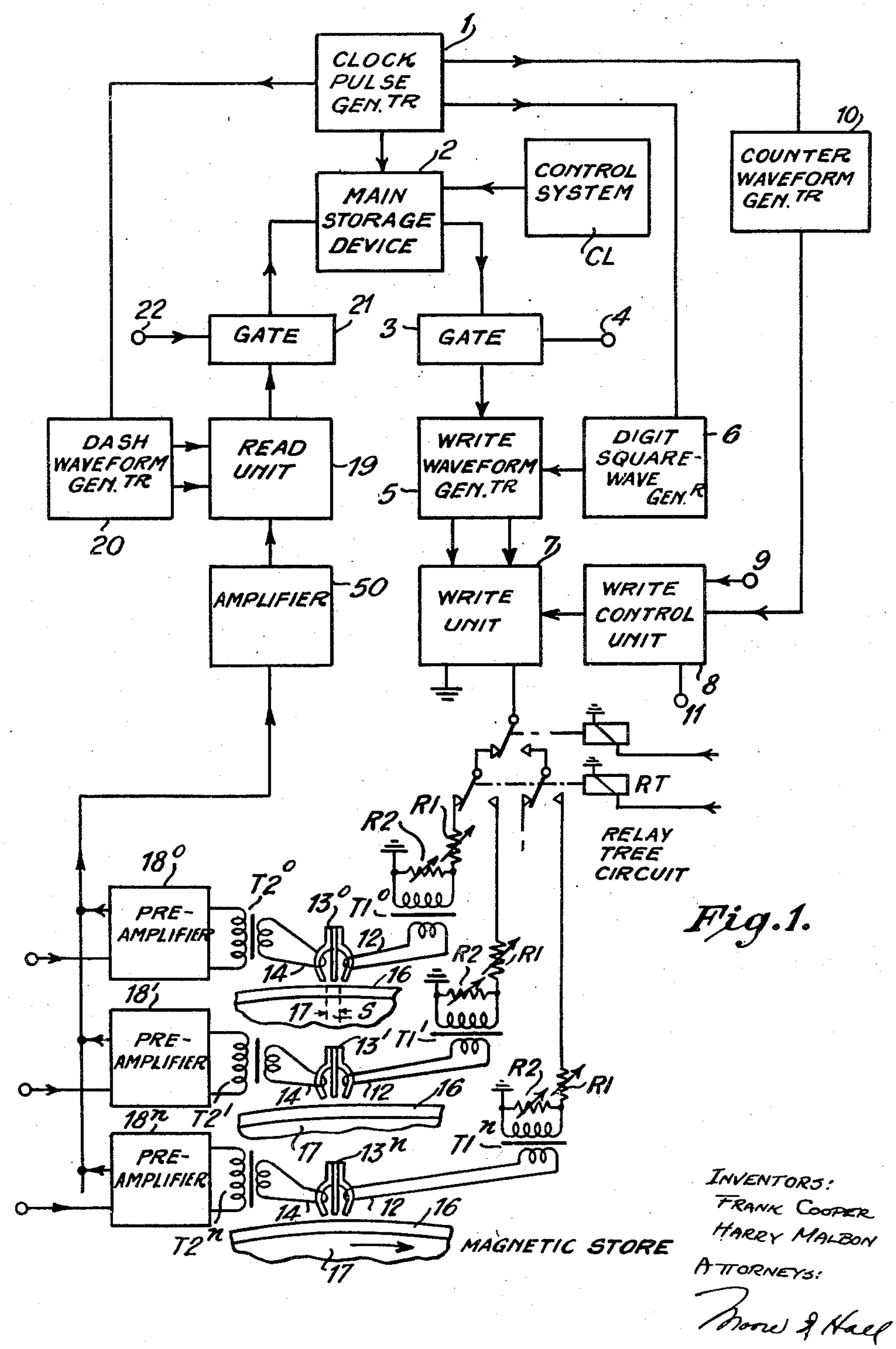

Fig. 1 illustrates a schematic arrangement of a complete system for the magnetic storage of binary digital information for use in an electronic digital computing machine of the general kind described in the aforesaid paper by Williams, Kilburn and Tootill. Briefly, binary digital information in the main storage device 2 is allowed to pass, in the form of a train of electric pulse signals, through the gate circuit 3 (when a suitable gate-opening potential is applied from a source 4) to the write waveform generator 5 whose function is to convert the train of signals into a form suitable for application to the write unit 7 which supplies an output current suitable for energising the write-coil winding 12 of any one of a plurality of recording/reproducing heads $13^0$, $13^1$ . . . $13^n$ cooperating respectively with separate parallel recording tracks 16 around the periphery of a rotating drum or wheel 17. Only one recording head is rendered operative at any one instance in dependence upon selection by the control system CL of the machine, by operation of the appropriate electromagnetic relays of a relay tree RT, in the case of the write-input to a head, and by the application of a suitable stimulating potential to the related one of a plurality of normally blocked preamplifiers $18^0$, $18^1$ . . . $18^n$, in the case of the read-output from a head. The current output from the write unit 7 is supplied to the chosen write-coil winding 12 by way of an individual transformer $T1^0$, $T1^1$ . . . $T1^n$. Similarly, binary-digital information in the magnetic store is read out by being picked up by the coil 14 of the operative recording/reproducing head and is then passed as an electric signal through the associated transformer $T2^0$, $T2^1$ . . . $T2^n$ to its preamplifier $18^0$, $18^1$ . . . $18^n$ and thence through amplifier 50 to the read unit 19 which converts the signals into a form suitable for feeding into the storage device 2 through the gate circuit 21 when opened by a suitable gate control potential from a source 22.

Figure 2:
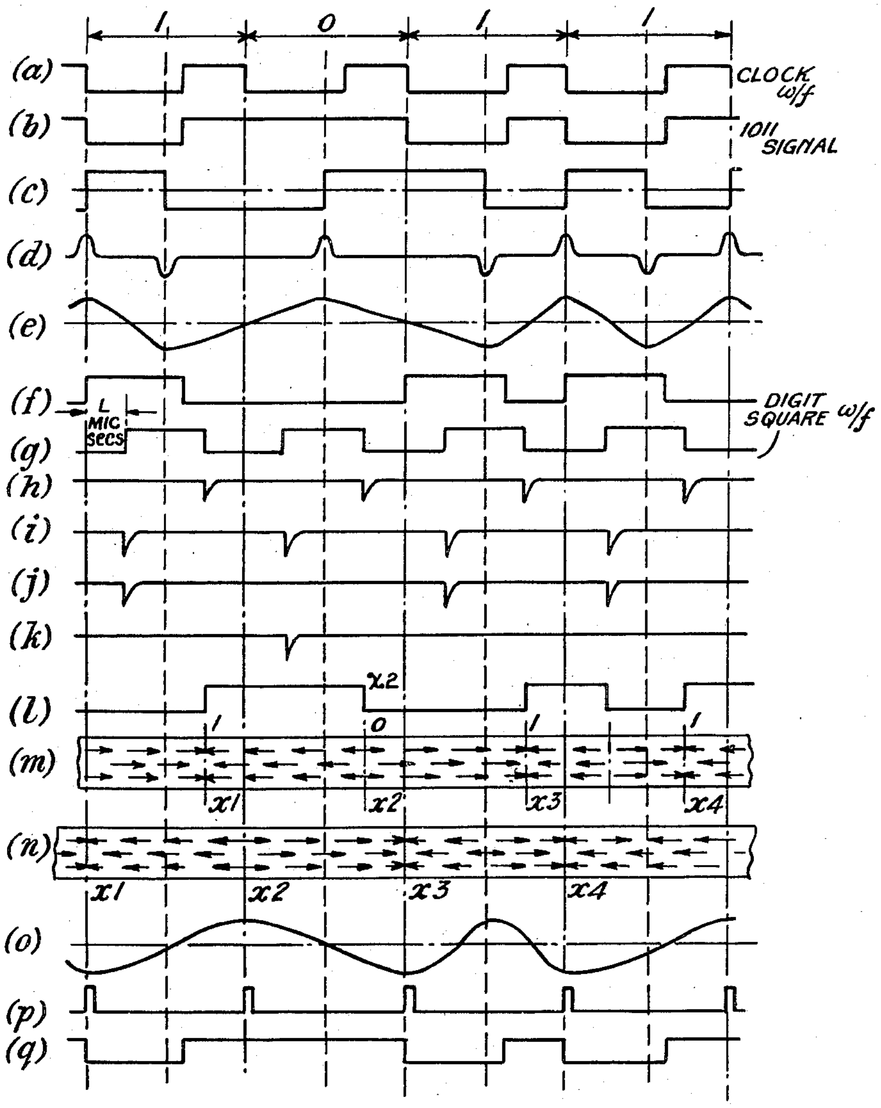

The operating rhythm of the machine comprises successive instruction or number word-intervals, sometimes known as beats, each of which is subdivided into a number of smaller and equal digit-intervals representing respectively progressively different powers of the basic radix number 2. In Fig. 2(*a*) is illustrated the basic timing or Clock waveform used and provided by the clock pulse generator 1 consisting of a crystal controlled 100 kc./s. oscillator and subsequent pulse-shaping means. This waveform comprises a series of negative-going pulses each of six microseconds duration at ten microseconds digit-intervals, the first digit pulse in any word-interval being significant of the binary digit $2^0$, the next $2^1$ and so on up to the particular word capacity of the machine, e. g. $2^{39}$ in the case of a 40-digit word. As in the machines of the paper and copending applications previously referred to, the binary digit "0" is signalled by the absence of any pulse during the related digit-interval while the binary digit "1" is signalled by the presence of a negative-going pulse, derived from the Clock pulse waveform and in coincidence with the pulses of such waveform during the particular digit-interval concerned. Fig. 2(*b*) illustrates the signal within the machine for the binary number 1011.

A more detailed description of the writing-in and reading-out arrangements will now be given showing how both writing and reading operations are synchronised, as they must be, with the basic timing or Clock waveform. As in the machine described in the aforesaid paper by Williams, Kilburn and Tootill, the main storage device 2 takes the form of a number of cathode ray tube storage devices of the kind described in detail in the paper by F. C. Williams and T. Kilburn, entitled "A Storage System for Use With Binary-Digital Computing Machines" published in the Proceedings of the Institution of Electrical Engineers, London, March 1949, vol. 96, part III, pages 81 to 100. Such storage devices store digital information in the form of binary numbers as conditions of electrostatic charge in one of two states upon discrete areas of their screens. The stored binary numbers are read out of, or written into, these cathode ray tube stores as a train of pulse signals in one of two states, at a rate determined by the clock pulse generator. The clock pulse generator 1 is used to synchronise a number of generators of standard waveforms in the machine and Figure 1 shows a number of such generators—the Dash waveform generator 20, a Counter waveform generator 10, and a Digit Square Wave generator 6 which are used to synchronise to the rhythmic operation of the rest of the machine the train of pulse signals fed into and from the magnetic store 17.

The magnetic storage medium employed is a nickel-plated layer 16 on the cylindrical surface of the drum 17 which is made of a non-magnetic material such as brass. The drum is rotated by a motor and the recording 1 reproducing heads $13^0$, $13^1$ . . . $13^n$ are mounted in close proximity to the surface of the drum. Each composite device 13 which functions for both recording or "writing" and reproducing or "reading," has a coil 12 for writing which is arranged to produce magnetisation of the nickel layer, and has a coil 14 for reading the recorded magnetisation pattern as it moves past on the rotating drum. The direction of magnetisation in the recording surface will be in the circumferential direction and the coils 12 and 14 may each conveniently comprise a single turn or two turns interlinking an external magnetic circuit which concentrates the flux in the recording medium.

The speed and angular position of the drum is controlled at any instant with reference to the digital repetition frequency set by the clock pulse generator, by a servo-system which is not shown but which is fully described in copending patent application No. 146,445, filed by F. C. Williams et al., now Patent No. 2,652,554, issued September 15, 1953, and in the paper by F. C. Williams and J. C. West, entitled "The Position Synchronisation of a Rotating Drum" published in Proc. I. E. E. vol. 98, part II, No. 61, February 1951, pages 29–34.

As shown in Figure 1 the write unit 7 is controlled by a write control unit 8 which is arranged when keyed by a source 9 to allow digital information to pass through the writing unit 7 and be recorded on the drum during, and only during, the next complete revolution of the drum. Such a revolution of the drum is timed by the counter waveform generator 10 to be in synchronism with the complete cyclic operation of the store 2. It should be noted that it is necessary to prevent any output being generated by the write unit 7 in addition to gating the input signals in the gate circuit 3 as otherwise a continuous succession of "0's" would be written on the recording drum during periods when the gate circuit 3 is open. The write control unit 8 is also arranged to produce an output 11 which may be used to inhibit the production of controlling signals for synchronising the rotation of the drum in a manner described in the above mentioned patent application.

A more detailed description of the actual recording of pulse signals representing digital information as magnetisation patterns on a recording medium and the subsequent reproduction of these pulse signals will now be given with reference to Figure 3.

Figures 3, 6, 7, 8, 9:
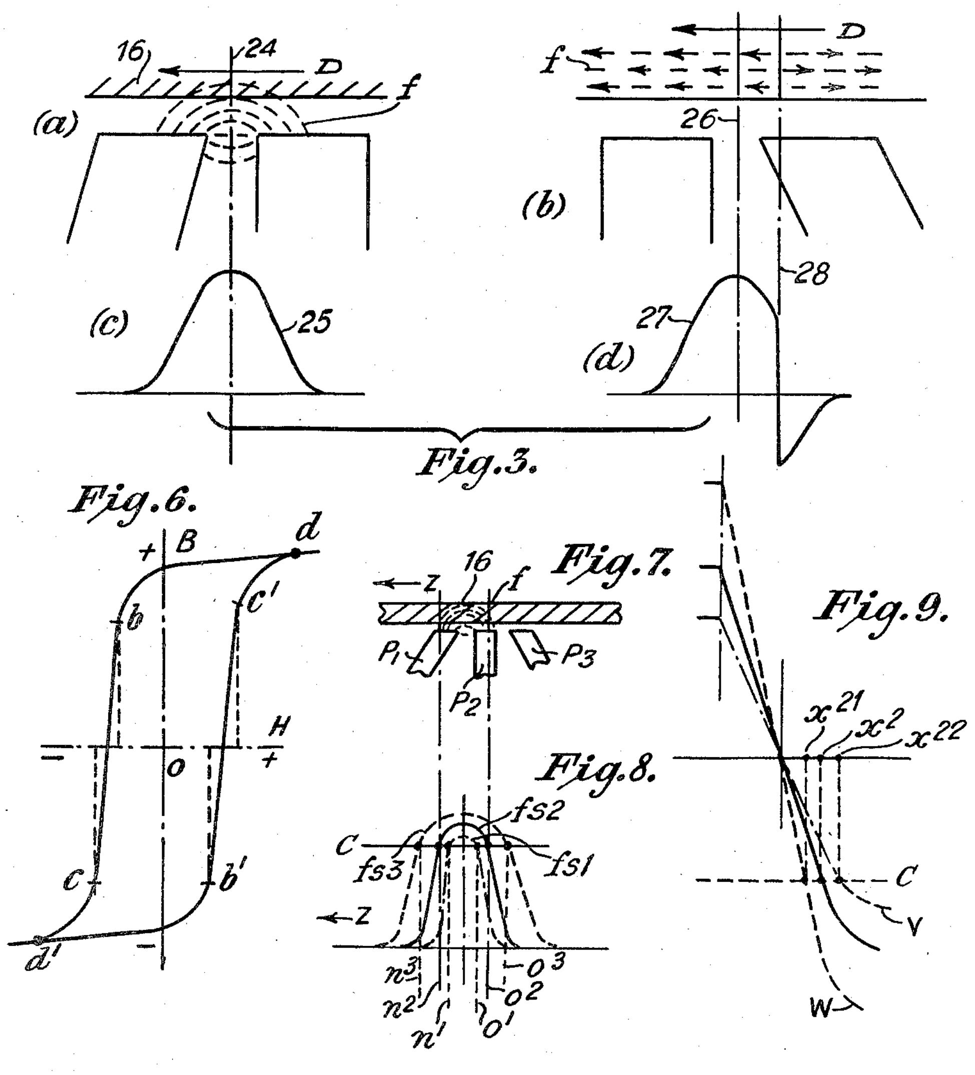
Fig. 6 is a graphical illustration of a representative B/H characteristic of the magnetic recording medium of the recording tracks.
Fig. 7 is a fragmentary view of the pole tip region of the head of Fig. 3 shown in its operative relation to the moving magnetic recording medium.
Fig. 8 shows graphically the flux distribution in the recording medium with the arrangement of Fig. 7.
Fig. 9 is a much enlarged version of a small portion of the waveform of Fig. 2(*b*).

An enlarged cross-sectional view of the writing elements of a combined recording/reproducing head is shown in Figure 3(*a*) and a similar view of the reproducing or pick-up elements of the head is shown in Figure 3(*b*). Due to minor irregularities in the periphery of the drum it is impracticable to set the recording head closer to the recording layer 16 than as shown to scale in Figures 3(*a*) and 3(*b*). The path of flux lines passing between the poles of the writing head elements is shown at *f* in Figure 3(*a*) while a plan view of the disposition of a typical recorded magnetisation pattern is shown at *f* in Figure 3(*b*) from which it can be seen that as the recording medium is moving relative to the heads in the direction of the large arrows D the direction of magnetisation will lie substantially in a circumferential direction.

Due to the finite thickness of the heads and their spatial disposition with respect to the recording medium the distribution of the magnetic field strength along the recording medium is approximately as shown by the curve 25 shown in Figure 3(*c*) for the instant when the writing head elements are in the mean position 24 shown.

Due to this spread of the magnetic field strength in the recording medium it is impossible to reproduce exactly abrupt changes in the direction of the energising current in the writing head.

Similar considerations apply to the pick-up head elements so that when such elements have a mean position 26 shown in Figure 3(*b*) with respect to the magnetisation pattern *f* which undergoes a complete reversal along the line 28, the flux induced in the pick-up head elements is as shown approximately by the curve 27 in Figure 3(*d*). The actual voltage induced in a wire interlinked with the pick-up head will be proportional to the rate of change of flux in the pick-up head and examination of the curve 27 will show that this rate of change is proportional to the magnitude of the flux at the reversal position wherever that may be. Thus the shape of the voltage waveform would be approximately in the form of an isosceles triangle having its maximum value when the position 28 of the magnetisation reversal was in line with the mean position 26 of the pick-up head elements.

Figure 2(*c*) shows the current waveform which has to be applied to the writing coil 12 of a recording head in order to lay down magnetisation patterns representative of a train of four binary digits 1011. The currents flow in a positive sense when the waveform is shown above and in a negative sense when shown below a zero current level indicated by the zero line *o* in the figure and the state of magnetisation will vary in a substantially similar manner subject to the limitations discussed in connection with Figure 3. Figure 2(*d*) shows the corresponding voltage waveform which will be induced in a pick-up head winding moving relatively to a medium on which these magnetisation patterns have been laid down. With the current waveform shown in Figure 2(*c*), the current flow in a positive direction during any and every digit interval is balanced by an equal current flow in a negative direction. This permits the use of pulse transformers for supplying the current to the recording heads which is preferable to the use of blocking oscillators or like circuits for supplying unbalanced current waveforms. A practical voltage response to the input current waveform shown in Figure 2(*c*) is as shown in Figure 2(*e*) and is practically sinusoidal in character.

A description will now be given of the writing circuits shown in Figure 1 as comprising the gate circuit 3, the write waveform generator 5, the write unit 7 and the write control unit 8. The description will be given with reference to Figure 4 which shows the gate circuit 3, write waveform generator 5, write unit 7 and write control unit 8 in greater detail and Figure 2 which shows explanatory diagrams of waveforms occurring at various parts of these circuits.

Figure 4:
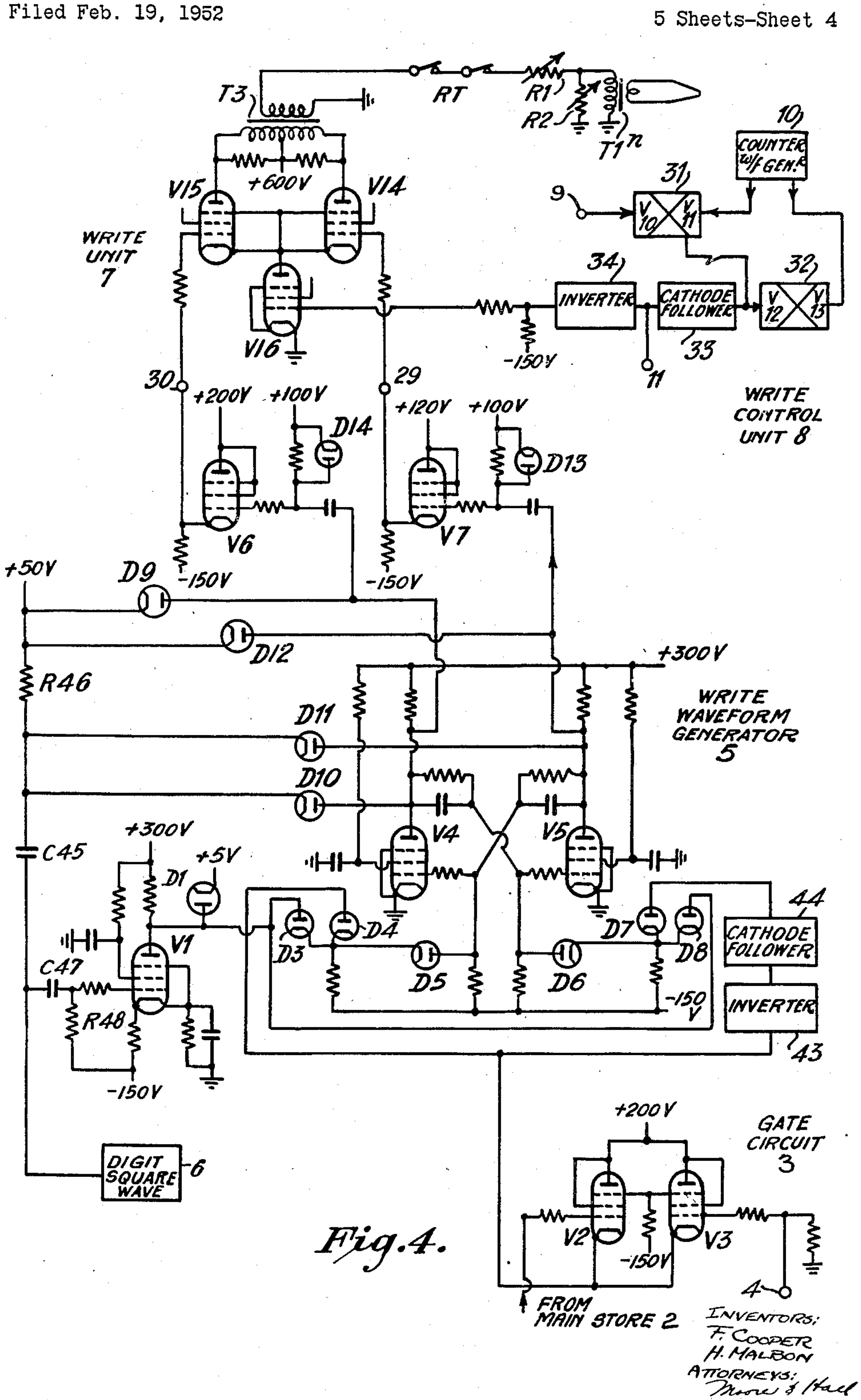
Fig. 4 is a more detailed circuit diagram of certain of those elements of Fig. 1 which are concerned with the writing-in of pulse signal form information to the magnetic storage medium.

As shown in Figure 4, the gate circuit 3 consists essentially of a pair of cathode follower valves V2 and V3. The grid of valve V2 is supplied with a train of pulse signals representing binary numbers from the main storage device 2 and for the purpose of explaining the action of the circuits this train is assumed to be in the form shown in Figure 2(*b*) representing the binary number 1011. The grid of the valve V3 is supplied from a controlling source 4 with a voltage which is held at 5 volts thus holding the common cathode at about +5 volts when no digit signals are required to be written into the magnetic store, and which is taken negative when digit signals are to be written in so that the common cathode point of the two valves can follow the voltage changes on the grid of valve V2. The output from such cathode point is as shown in Figure 2(*b*) and is supplied to the diode D4 in the write waveform generator 5 while an inverted form as shown in Figure 2(*f*) is supplied to the diode D7 through a conventional triode valve inverting circuit 43 and a D. C. restoring and cathode follower circuit 44.

The write waveform generator 5 consists essentially of a flip-flop comprising the two valves V4 and V5 which may be triggered by a repetitive trigger on the anodes and also by a series of gated trigger pips on both control grids. A voltage having a special waveform known as "Digit Square Wave" is generated externally in the unit 6. This waveform is shown in Figure 2(*g*). It has a period of 10 microsecs. and its front edge may be moved relative to the beginning of the digit period as defined by the clock pulse generator 1 of the computer. Thus in Figure 2(*g*) the initial separation "L" microsecs. may be controlled between 0.2 microsec. and 6 microsecs. The width of the square wave may also be controlled and a true 50–50 mark to space ratio obtained. This waveform voltage is now employed to generate two sets of repetitive trigger pips. Considering the anode trigger pips first, the square wave is differentiated with a 100 micro-micro-farads condenser C45 and 1.9 kilohms resistance R46 differentiating circuit and the negative spikes are applied to both anodes of the valves V4 and V5 through the diodes D10 and D11 respectively. The diodes D9 and D12 remove the positive spikes and limit the flip-flop swing, the triggering voltage then has a waveform as shown in Figure 2(*h*). The action of these trigger pips on the flip-flop will produce a half-frequency or halver waveform of 20 microsecs. period.

The Digit Square Wave voltage is also applied to valve V1 after being differentiated by the 100 micro-micro-farads condenser C47 and 10 kilohm resistance R48. The valve V1 is normally cut-off by a 20 v. positive bias on the cathode. The positive spikes of the differentiated grid voltage waveform turn on the valve for a small period and the anode voltage falls and is caught at +5 volts by the action of the diode D1 so when the valve conducts a 60-volt negative spike is produced as shown in Figure 2(*i*). These trigger pips occur mid-way between the anode trigger pips shown in Figure 2(*h*) and they are applied to the grids of the valves V4 and V5 by the two diodes gates, the first comprising diodes D3, D4 and D5 and the second comprising diodes D6, D7 and D8.

The first gate which is attached to valve V4 consists of an "And" gate in diodes D3 and D4 which is coupled to the grid of valve V4 by the diode D5 in such a manner that both of the diodes D3 and D4 must be driven negative in order to pass a negative pulse through the diode D5. The anode of diode D3 is fed with repetitive trigger pips and the anode of diode D4 is fed from the gate circuit 3 by the waveform shown in Figure 2(*b*) which represents the binary number 1011 to be reinterpreted. For a digit period containing a "0" the anode of diode D4 is held at +5 volts and no trigger pip passes through the gate. For a "1" however the anode is taken to —20 volts for 6 microsecs. and when the anode of diode D3 goes negative then the cathode will follow and a negative pip is applied to the grid of valve V4 through diode D5. The triggering voltage waveform applied to the grid of valve V4 is thus as shown in Figure 2(*j*). It will be seen due to the variable delay of the edge of the Digit Square Wave, the trigger pip produced by this edge may be oriented relative to the digit pulse.

In the case of the second gate which is attached to valve V5 an exactly similar action occurs but the gating voltage applied to the anode of diode D7 as shown in Figure 2(*f*) is the inverse of that applied to the other gate and a trigger pip is obtained on the grid of valve V5 for every pip that was gated out on valve V4. The triggering waveform applied to the grid of valve V5 is thus as shown in Figure 2(*k*).

The resultant output voltage waveform is illustrated in Figure 2(*l*) for the output 29, derived from the anode of valve V5. To trace the formation of this waveform voltage consider the trigger pip shown in Figure 2(*k*). This pip is applied to the grid of valve V5 so that the anode must rise to, if not already at, its positive level at this instant. 5 microsecs. later a common anode trigger pip is applied and the flip-flop reverses its state so that the anode of valve V5 falls to the negative level. The next grid trigger pip is applied to the grid of valve V4 which is however already cut-off so that no change takes place. The complete formation of Figure 2(*l*) may be traced in this way from the sets of trigger pips drawn.

This output voltage waveform is actually the inverse of the waveform shown in Figure 2(*c*) and its phase is delayed by a time "L" microsecs. from the input information shown in Figure 2(*b*). This delay may be controlled, as already stated, between 0.2 microsec. and 6 microsecs. by varying the phase of the digit square wave, for the trigger pips may be gated anywhere in the 6 microsecs. extent of the negative pulse representing a "1." This facility is used to introduce a controlled delay in the writing path which is used to compensate for the excess phase advance in the reading path in a manner more fully discussed with reference to the reading circuits.

The signal output voltages from the anodes of both valves V4 and V5 are D. C. restored below +100 v. by the action of the diodes D14 and D13 respectively and are prevented from falling below +50 v. by the action of diodes D9 and D12 respectively. A voltage having a waveform shown in Figure 2(*l*) is thus fed through the cathode follower valve V7 to the output terminal 29 while a voltage having an inverted waveform is fed through the cathode follower valve V6 to the output terminal 30.

The two antiphase outputs from the generator 5 are fed from terminals 29 and 30 onto the control grids of the two output valves V14 and V15 connected in push-pull. The two ends of the centre-tapped primary winding of the drive transformer T3 are connected to the two anodes, the centre tap being taken to +600 volts. The common cathodes of the pair are taken to the anode of valve V16. If the control grid of valve V16 is negative then no current can flow through the push-pull pair and no current flows through the drive transformer T3. The tail valve V16 is therefore employed for switching the write unit, a positive going waveform being applied to the control grid when it is desired to write. As the input signals applied to valves V14 and V15 correspond to the output signals described in the account on the write waveform generator, the level of signal being between +100 volts and +50 volts, the common cathode of the pair is maintained at a steady potential of +100 volts. When the grid of valve V16 is taken slightly positive the valve conducts and supplies a steady current to whichever of the valves V14 or V15 has the more positive control grid at this instant. This current then flows in the relative half of the primary of the drive transformer T3. The drive transformer T3 is designed to be a voltage stepdown transformer and drives the selected recording head winding 12 through the associated transformer T1, conveniently a miniature step-down device situated in the block on which the recording/reproducing head 13 is mounted.

The write control unit 8 of Fig. 1 is shown in Figure 4 controlling the tail valve V16 in the write unit 7 and is arranged to generate a voltage having a waveform which is negative-going for the next complete drum revolution period of 28 millisecs. after the application of a short duration negative pulse from the controlling source 9. This pulse may be derived by differentiating a sudden change in voltage level occasioned by the closing of a manually operated key. This key would be operated when it was desired to commence a transfer of digital information from the rest of the machine to the magnetic store.

The negative pulse is applied to the grid of valve V10 which is one of two valves V10 and V11 forming the flip-flop 31 which is connected in a manner similar to the flip-flop comprising the pair of valves V4 and V5 shown in Figure 4. The grid of valve V11 is repetitively triggered by trigger pips occurring once every complete revolution of the drum and derived from the counter waveform generator 10 which synchronises the raster in the cathode ray tube stores in the main storage device 2 of the computing machine. The flip-flop 31 is therefore normally set once per revolution with the anode of valve V10 in the lower voltage state. The random trigger pulse derived from the source 9 drives the anode of valve V10 positive. On the following retrigger pip this anode voltage is driven negative again. This edge is differentiated and applied to the grid of valve V12 which is one of two valves V12 and V13 forming a similar flip-flop 32. At the same time a retrigger pip will be applied from the generator 10 to the grid of valve V13 but the pulse on the grid of valve V12 is arranged to be of longer duration so that the grid of valve V12 is driven negative until the following retrigger pulse is applied to the grid of valve V13. The flip-flops will then remain in their normal states with the grid of valve V12 at roughly earth potential until a pulse from the source 9 commences the cycle again.

The voltage on the grid of valve V12 is applied to the grid of the tail valve V16 through a cathode follower 33 and a conventional triode valve inverter 34 so that a positive voltage is applied to this grid opening the valve during one revolution of the wheel.

A description will now be given of the reading circuits shown in Figure 1 as comprising the pre-amplifier 18, main amplifier 50, the read unit 19 and the gate circuit 21. The description will be given with reference to Figure 5 which shows the path of a signal picked up in the reading coil 14 through to the input of the gate circuit 21 and with reference to Figure 2 which shows waveforms appearing in various parts of the circuits shown in Figure 5.

Before a detailed description of the circuits is given the inter-relationship between the reading and writing heads will be discussed with reference to Figure 2. As previously described and illustrated in Figure 2 the magnetisation pattern representing the binary number 1011 laid down on the recording medium as shown in Figure 2(*m*) is arranged to be "L" microsecs. later than the train of pulse signals shown in Figure 2(*b*) that it represents. The voltage waveform induced in the reading coil of a reading head cooperating with this recording track is shown in Figure 2(*n*). This waveform is derived in a manner already explained. Examination of Figure 2(*n*) reveals that the biggest margin of discrimination occurs in the middle of the digit period when the voltage waveform is at a negative peak when the digit represented is a "1" and the waveform is at a positive peak when the digit represented is a "0." This voltage produced by the reading head is thus sampled at the middle of the digit periods by a train of strobe or marker pulses as shown in Figure 2(*p*). An indication of the nature of a digit is therefore not given until around about the middle of the digit period so that the reproduced train of digit signals shown in Figure 2($q$) occurs around about, actually half a digit period ($L+5$) microsecs., later than the original train of digit signals shown in Figure 2($b$) fed into the writing circuits. It is for this reason that separate head elements are used for writing and reading, i. e. in order to counterbalance the ($L+5$) microsecs. delay together with any delay "D" microsecs. occurring in the reading circuit amplifiers, by arranging the writing head is arranged to lie ahead of the reading head in the path of the recorded track by a distance "S" as shown in Figure 1.

Figure 5:
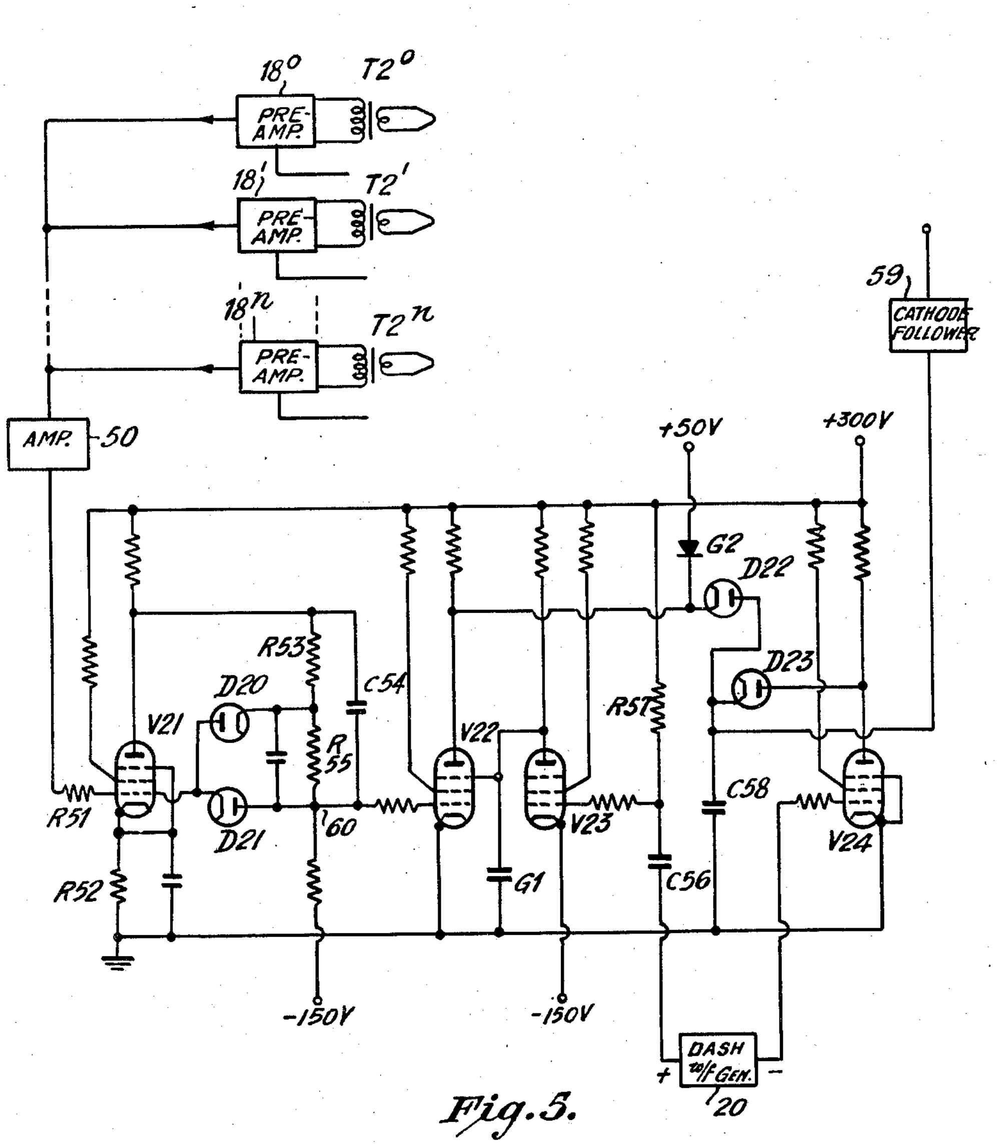
Fig. 5 is a more detailed circuit diagram of other elements of Fig. 1 concerned with the reading-out of recorded pulse signals from the magnetic recording medium.

As shown in Figure 5 the pick-up signal at a level of about 50 micro-volts in each of the reading coils 14 of the heads $13^0$, $13^1$ . . . $13^n$ is passed through a miniature step-up transformer $T2^0$, $T2^1$ . . . $T2^n$ to an associated preamplifier $18^0$, $18^1$ . . . $18^n$ etc. The output of the required one of the pre-amplifiers $18^0$, $18^1$ . . . $18^n$ is selected by removing a cut-off bias voltage from a grid of the amplifier valve. This output is connected to the main amplifier 50 which comprises a number of conventional valve amplifying stages.

The pick-up signal which has been amplified to the order of 20 volts and which still retains its sine wave character as shown in Figure 2($n$) is applied through the 47 kilohm resistance R51 to the grid of valve V21 which squares this voltage waveform so that the voltage waveform shown in Figure 2($q$) is produced at the point 60 for application to the grid of the valve V2. This transformation is carried out in the following manner.

The bias resistor R52 of 4.7 kilohms in the cathode of valve V21 establishes a positive potential on the cathode. Consider the amplifier connected end of resistance R51 to be taken negative. The grid will tend to go negative and therefore the anode voltage will rise positively. This positive rise will be transmitted back to the grid through the 100 kilohm feed-back resistor R53, resistance R55 and 0.1 microfarad condenser C54 so that the change of grid voltage will be compensated and the grid voltage will be held within the grid base of the valve. A current will therefore flow through the resistor R51 from the grid to the amplifier coupled end. This current must flow through the diode D21 so that the anode of D21 will be held at the grid potential which approximates to the cathode potential of valve V21. Therefore when the applied voltage from the amplifier goes negative about a mean level then the output voltage is held slightly positive. When the input voltage is positive then exactly the same feedback action occurs and the diode D20 is conductive. The cathode of D20 is therefore held at cathode potential. The potential at the tapping point 60 is therefore held at 7 volts more negative due to the constant voltage drop across the 4.7 kilohm resistance R55 in the chain. Therefore when the input from the amplifier 50 is positive relative to the mean level, then a voltage of −7 v. is produced at the output point 60. This effect is illustrated in Figure 2($q$), assuming that the output from the amplifier 50 is in antiphase to the waveform shown in Figure 2($o$). The slope of the change-over edges of the waveform is finite in practice due to the non-ideal characteristics of the diodes D20 and D21.

This voltage waveform is applied to the grid of valve V22. The suppressor is switched by a fine strobe or marker pulse shown in Figure 2($p$) generated in valve V23. The Dash waveform generator 20 supplies the Dash waveform which is virtually identical with the Clock waveform shown in Figure 2($a$) and this is differentiated by the 56 micro-microfarad condenser C56 and 150 kilohm resistance R57 and is applied to the control grid of valve V23 which cuts the valve off for a very short period of less than 1 microsec. duration at the beginning of each digit period. A positive-going pulse is produced on the anode and applied to the suppressor of valve V22, being caught by a germanium crystal G1 at earth potential. Valve V22 is therefore only allowed to pass anode current for a short period at the beginning of each digit period. If the control grid of valve V22 is positive when the strobe is applied then the potential on its anode is reduced to as low a value as possible for the duration of the strobe. If the grid is negative then the anode remains at +50 volts, caught by the crystal G2. A negative spike produced on the anode of valve V22 pulls the 56 micro-microfarad condenser C58 down to 10 volts through the diode D22. The condenser C58 remains at this potential until it is pulled back to the +50 volts level by the negative or anti-phase Dash waveform generated in valve V24. The condenser voltage is fed to the cathode follower circuit 59. The resultant action of the strobing mechanism is that a positive level at the grid of valve V22 during a strobe instant produces a 6 microsec. negative pulse at the output, while a negative level leaves the output signals unchanged. The resultant output signal obtained is shown in Figure 2($q$) and is a reproduction of the input signal to the writing circuits shown in Figure 2($b$).

The train of digit signals having the waveform shown in Figure 2($q$) is fed from the cathode follower 59 to the gate circuit 21 which allows the signals to pass through to the main storage device 2 on application of a gating voltage from the source 22 as described in connection with Figure 1. The gate circuit 21 can be similar to the gate circuit 3 shown in and described in connection with Figure 4.

From the above it will be clear that any physical inaccuracy of the mechanical spacing distance S (Fig. 1) between the effective centre of the magnetic flux gap of the read head elements and the centre of the corresponding gap of the write head elements from that which is precisely correct will have a phase disturbing effect and the read-out signal will either be phase-advanced or phase-delayed to some extent with respect to the appropriate digit-intervals of the machine rhythm. Further discrepancies in timing may arise due to unpredictable variations in the electrical characteristics of the read head elements and/or the write head elements. The physical separation distance on the recording track between two adjacent points $x^1$, $x^2$, $x^3$, $x^4$, of the diagrams of Fig. 2($m$) or Fig. 2($n$) may be of the order of only .01 inch and the spacing distance S (Fig. 1) between the adjacent read and write head flux gaps may be appreciably less than such inter-digit spacing so that the manufacture of such heads is clearly difficult. When, as is necessary in a practical store, several hundred parallel tracks 16 are each provided with a combined recording head 13, the difficulty of maintaining the required physical accuracy of dimension of each pair of head elements and the disturbing effect of any relative difference between head elements will be self-evident and it is desirable to provide some manner of adjusting the effective distance "S" between the heads.

Referring now to Fig. 6, which shows the B/H characteristic curve of a typical recording medium, it will be seen that it is necessary to apply a considerable counter-magnetisation force in order to carry the magnetisation state of the ferromagnetic medium employed past the knee at either end of the curve towards the opposite end of the curve so as to achieve the desired change of magnetisation. Once past such knee however the required reversal takes place quite abruptly.

Assuming, for instance, that the magnetisation existing during one of the positive-going current pulses of Fig. 2($l$) is that of the point $a$ Fig. 6, then little change of magnetisation will be caused at the instant of reversal until the point $b$ is reached corresponding to an appreciable current amplitude of negative polarity. Thereafter a further comparatively small increase of negative current pulse amplitude will carry the magnetisation to the point $c$, Fig. 6. The current level corresponding to point $c$, Fig. 6, may accordingly be regarded as the critical current level at which abrupt change of magnetisation state will take place in the negative-going direction, i. e. will mark the point $x^2$, of of Fig. 2($n$).

Referring now to Fig. 7 which illustrates diagrammatically a typical combined recording head construction in which the magnetisation state of the recording medium 16 is determined by the flux $f$ produced between the closely adjacent pole-tips P1, P2 of the head. The field strength $f$ is concentrated around the gap between the pole tips and falls off rapidly on either side as indicated graphically by Fig. 8 which depicts the relative magnetic flux distribution in the recording medium at different positions along the medium relative to the head for three different strengths of energisation current in the head winding 12 (Fig. 1).

By reason of the above described hysteresis effect there is a clearly defined level of flux strength at and above which the state of magnetisation of the medium is changed and below which it is not. In Fig. 8 such a level is indicated at C which may be regarded as equivalent to the point C on the curve of Fig. 6. The points at which the flux distribution curve rises above this level C can be regarded as marking the region in the medium 16 constituting the recording produced by the head. Thus, if the writing current strength applied to the head is sufficient only to produce the flux distribution curve $fs$1, then the changed state region will extend from point $n$1 to point $o$1, if energization is according to curve $fs$2, then the changed state region is from $n$2 to $o$2 and if the energisation is increased to accord with the curve $fs$3 then the changed state region will be from $n$3 to $o$3.

As will be evident from consideration of the previous detailed description of the writing operation it is the leading point of change, e. g. the points $n$1, $n$2 or $n$3, if the medium 16 is assumed to be moving relative to the head in the direction of the arrow $z$, Figs. 3 and 4, which are of significance, the trailing points $o$1, $o$2 or $o$3 being probably modified by the subsequent writing operation of the next following digit-signal pulse. If, as will be the case, the recording medium is being moved in precisely timed relationship to the digit-interval rhythm of the associated machine, then at any reproducing head, e. g. constituted by the pole tips P2 and P3, Fig. 7, the abrupt change of magnetisation will be read out progressively earlier, relative to the machine rhythm, when the recording flux strength was in accordance with the curves $fs$2 and $fs$3 Fig. 8 than it would have been if the strength was in accord with curve $fs$1. Such a change of reading-out timing is equivalent to a change of position of the read head relative to its associated write head by which the record is initially provided.

In the above description of the effects of different strengths of write head currents, it has been assumed that the current pulses used for energising the write head were of idealised square-wave form but in practice such waveform pulses have appreciable slope in their leading edges as may be seen from Fig. 9 which is a much enlarged scale version of the pulse edge portion at $x^2$ of diagram ($l$) of Fig. 2.

If the amplitude of the current pulse applied to the write head be altered then the slope of its front edge will be changed and the time interval between the beginning of the pulse and the instant when the current reaches the critical level C, will be altered. For example, if the pulse amplitude is increased as indicated by the dotted line curve W in Fig. 9 the level C required to effect the required abrupt change will be reached earlier at instant $x$21 and the corresponding reversal point on the track will be advanced. Similarly, if the pulse amplitude be decreased as shown by the chain dotted line V in Fig. 9 the point at which abrupt change is effected will be retarded and the corresponding point on the record will be delayed as shown at $x$22. When it is remembered that the track itself is being moved physically in accurate synchronism with the digit intervals of the machine, i. e. in synchronism with the Clock waveform of Fig. 2($a$) it will be evident that the subsequently derived signals produced by the read head elements will be correspondingly advanced or retarded relative to the original, and assumed correctly timed, input signals or in other words an effect is obtained which is equivalent to mechanical adjustment of the spacing distance between the read and write heads.

The required adjustment of the amplitude of pulse signal applied to the write head is necessarily effected somewhere between the point where the output from the write unit 7 (Fig. 1) is selectively directed to the chosen write head and that write head itself and a convenient point is in the input circuit between the selecting relays and the particular step-down transformer $T1^0$, $T1^1$ . . . $T1^n$ as shown in Figs. 1 and 4 whose low impedance output winding supplies the necessary energising current to the write head winding 12 operating upon the recording track 16. The change of amplitude is preferably effected by the inclusion of a series resistor R1 with, if necessary, a parallel or shunting resistor R2. The resistor R1, and the resistor R2 if provided, may be made variable as shown but in practice it has been found that a suitable selection from one of the standard tolerance range of resistors provides sufficiently accurate adjustment for most purposes; the required selection can conveniently be effected by temporarily inserting calibrated variable resistors and after adjusting these to obtain the required synchronism and then substituting therefor the nearest available value of resistor from the normal range available.

Figure 10:
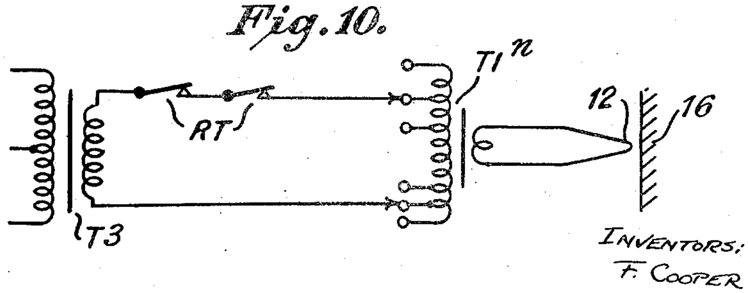
Fig. 10 is a fragmentary circuit diagram showing a modification.

In an alternative arrangement shown in Fig. 10 the primary winding of each input transformer $T1^0$, $T1^1$ . . . $T1^n$ is provided with a plurality of tappings, conveniently at single turn intervals at one end 60 and at ten-turn intervals at the other end 61, whereby an equivalent adjustment of output current is obtainable by appropriate choice of tappings.

We claim:

1. A magnetic storage system for the recording and subsequent reproduction of electric pulse signal trains in synchronism with a supervisory timing control and comprising a member carrying a magnetic recording medium, said member being movable at a speed synchronised with said supervisory timing control, a writing-in head structure including a magnetic flux gap adjacent said recording surface and an energising winding for said magnetic flux gap, means for supplying to said winding an energising current which includes an abrupt change of value at an instant related to said supervisory timing control, a reading-out head structure including a magnetic flux gap adjacent said recording surface at a position in advance of said flux-gap of said writing-in head structure relative to the direction of movement of said recording medium and an energised winding associated with said flux gap, current adjusting means between said current supply means and said energising winding for adjusting the proportion of available energising current for said energising winding of said writing-in head structure which is actually applied to said winding whereby the read-out signal from said energised winding of said reading-out head structure resulting from an abrupt change in the current previously supplied to said energising winding of said writing-in head structure may be altered in its timing relative to said supervisory timing control.

2. A magnetic storage system for the recording and subsequent reproduction of electric pulse signal trains in synchronism with a supervisory timing control and comprising a member carrying a magnetic recording medium, said member being movable at a speed synchronised with said supervisory timing control, a plurality of recording heads each comprising writing-in head elements including a magnetic flux gap adjacent said recording surface and an energising winding for said magnetic flux gap, and reading-out head elements including a magnetic flux gap adjacent said recording surface at a position in advance of said writing-in structure relative to the direction of movement of said recording medium and an energised winding associated with said flux gap, means for supplying an energising current which includes an abrupt change of value at an instant related to said supervisory timing control and electric switching means for selectively connecting any desired single energising winding to said energising current supply means and a separate current adjusting means between each of said energising windings and said switching means for adjusting the proportion of available energising current for said energising winding of said selected recording head which is actually applied to said winding whereby the read-out signal from said energised winding of the related reading-out head elements of said selected recording head resulting from an abrupt change in the current previously supplied to said energising winding of said writing-in head elements may be altered in its timing relative to said supervisory timing control.

3. A magnetic storage system for the recording and subsequent reproduction of electric pulse signal trains each in synchronism with a supervisory timing control and comprising a member carrying a magnetic recording medium, said member being movable at a speed synchronised with said supervisory timing control, a plurality of combined recording/reproducing heads each comprising writing-in head magnetic elements defining a first magnetic flux gap adjacent said recording surface and an energising winding for said magnetic elements, reading-out head magnetic elements defining a second magnetic flux gap adjacent said recording surface at a position in advance of said first magnetic flux-gap relative to the direction of movement of said recording medium and an energised winding associated with said reading-out head elements, a source of square pulse form energising current which provides energising current pulses whose leading and trailing edges occur at instants bearing a predetermined timing relationship to said supervisory timing control, electric switching means for selectively connecting any desired one of said energising windings to said source of energising current pulses and a separate attenuator network between each of said energising windings and said switching means for adjusting the proportion of available energising current for said energising winding which is actually applied to said winding whereby the read-out signal from said energised winding of the same recording head resulting from a pulse in the current previously supplied to said energising winding may be altered in its timing relative to said supervisory timing control.

4. A magnetic storage system in accordance with claim 3 in which said attenuator network comprises a resistive element in series connection between said switching means and said energising winding.

5. A magnetic storage system in accordance with claim 3 in which said attenuator network comprises a first resistive element in series connection between said switching means and said energising winding and a second resistive element in shunt connection across the supply connections to said energising winding.

6. For a magnetic storage system for the recording and subsequent reproduction of electric pulse signal trains in synchronism with a supervisory timing control, a combined writing-in and reading-out recording head structure comprising magnetic flux path elements defining two adjacent but spacially separated magnetic flux gaps, an energising winding for producing a magnetic field across one of said gaps, an energised winding for producing an output voltage from a magnetic field interlinking with the other of said gaps, a source of energising current for said energising winding, said energising current including abrupt changes of value at predetermined instants relative to said supervisory timing control and means for adjusting the proportion of current available from said source which flows through said energising winding.

7. For an electronic binary digital computer operating at a predetermined timing rhythm with binary members represented as serial pulse signal trains, a magnetic information storage device including a drum rotating at a speed synchronised with said timing rhythm and having a cylindrical magnetic recording surface accommodating a plurality of separate parallel magnetic recording tracks therearound, a combined writing-in and reading-out head for each of said tracks, each of said combined heads comprising first magnetic flux path members defining a first magnetic flux gap adjacent to its associated recording track and second magnetic flux path members defining a second magnetic flux gap adjacent to said track and slightly spaced from said first flux gap in a direction ahead of said first flux gap relative to the direction of movement of said track with respect to said flux gaps, a separate energising winding associated with each of said first magnetic flux path members of said plurality of heads and a separate energised winding associated with each of the second magnetic flux path members of each of said heads, a step-down transformer for each of said energising windings, means connecting the lower impedance winding of said transformer to said energising winding, an energising current waveform source for operation of an energising winding of said heads, said waveform including abrupt changes of polarity according to the nature of the information to be recorded in said magnetic store, electric relay switching means for selectively connecting the higher impedance winding of any one of said transformers to said energising current waveform source and means intermediate said switching means and each of said higher impedance transformer windings for adjusting the proportion of current available from said source which is applied to said winding.

8. An electronic binary digital computing machine according to claim 7 wherein said current adjusting means comprises an attenuator network.

9. An electronic binary digital computing machine according to claim 7 wherein said current adjusting means comprises a series connected first resistance between said switching means and said winding and a shunt connected second resistance across said winding.

10. A magnetic storage system for the recording and subsequent reproduction of electric pulse signal trains each in synchronism with a supervisory timing control which comprises a movable member carrying a magnetic recording medium, said member being movable at a speed in synchronism with said supervisory timing control, a writing-in head structure including a magnetic flux gap adjacent said recording surface and an energising winding for said magnetic flux gap, a source of square pulse form energising current for said winding and providing energising current pulses whose leading edges occur at time instants determined by said supervisory timing control, a reading-out head structure including a magnetic flux gap adjacent said recording surface at a predetermined fixed position in alignment with but in advance of said flux gap of said writing-in head structure relative to the direction of movement of said recording medium and an energised winding associated with said flux gap and current adjusting circuit means between said source of energising current and said energising winding of said writing-in head structure for adjusting the proportion of the energising current available for said energising winding which is actually supplied to said energising winding whereby the read-out signal from said energised winding of said reading-out head structure resulting from a pulse in the energising current previously supplied to said energising winding of said writing-in head structure may be altered in its timing relative to said supervisory timing control.

11. A magnetic storage system for the recording and subsequent reproduction of electric pulse signal trains each in synchronism with a supervisory timing control which comprises a movable member carrying an endless magnetic recording medium, said member being continuously movable at a speed in synchronism with said supervisory timing control, a combined recording/reproducing head device comprising a writing-in head structure including a magnetic flux gap adjacent said recording surface and an energising winding for said magnetic flux gap, and a reading-out head structure including a magnetic flux gap adjacent said recording surface at a fixed position adjacent to and in alignment with but in advance of said flux gap of said writing-in head structure relative to the direction of movement of said recording medium and an energised winding associated with said flux gap, a source of square pulse form energising current for said winding and providing energising current pulses whose leading and trailing edges occur at instants bearing a predetermined timing relationship to said supervisory timing control, and current adjusting circuit means between said source of energising current and said energising winding of said writing-in head structure for adjusting the proportion of the energising current available for said energising winding which is actually supplied to said energising winding whereby the read-out signal from said energised winding of said reading-out head structure resulting from a pulse in the energising current previously supplied to said energising winding of said writing-in head structure may be altered in its timing relative to said supervisory timing control.

12. A magnetic storage system for the recording and subsequent reproduction of electric pulse signal trains each in synchronism with a supervisory timing control which comprises a movable member carrying a magnetic recording medium, said member being movable at a speed in synchronism with said supervisory timing control, a plurality of recording/reproducing heads each comprising writing-in head elements including a magnetic flux gap adjacent said recording surface and an energising winding for said magnetic flux gap and reading-out head elements including a magnetic flux gap adjacent said recording surface at a position in alignment with but in advance of said flux gap of said writing-in head elements relative to the direction of movement of said recording medium and an energised winding associated with said flux gap, a source of energising current providing an energising current which includes an abrupt change of value at an instant having a predetermined timing relationship to said supervisory timing control, electric switching means for selectively connecting any desired single energising winding to said source of energising current, and separate current adjusting circuit means between said electric switching means and each of said energising windings of said recording/reproducing heads for separately adjusting the proportion of the energising current available for said energising windings which is actually supplied to each of said windings whereby the read-out signal from said energised winding of said reading-out head elements resulting from an abrupt change in the energising current previously supplied to the energising winding of said writing-in head elements of the same recording/reproducing head may be altered in its timing relative to said supervisory timing control.

13. A magnetic storage system for the recording and subsequent reproduction of electric pulse signal trains each in synchronism with a supervisory timing control which comprises a continuously rotating drum carrying a magnetic recording medium around its circumferential surface, said drum being rotated at a speed in synchronism with said supervisory timing control, a plurality of unitary combined recording/reproducing heads each comprising writing-in head elements including a first magnetic flux gap adjacent said recording surface and an energising winding for said magnetic flux gap and reading-out head elements including a second magnetic flux gap adjacent said recording surface at a fixed and non-alterable position in alignment with but in advance of said first magnetic flux gap relative to the direction of movement of said recording medium and an energised winding associated with said second magnetic flux gap, a source of square pulse form energising current providing energising current pulses whose leading and trailing edges occur at instants bearing a predetermined timing relationship to said supervisory timing control, electric switching means for selectively connecting any desired single energising winding to said source of energising current pulses and a separate current attenuator network connected between said switching means and each of said energising windings of said writing-in head structures for adjusting the proportion of the energising current available for said energising windings which is actually supplied to each of said windings whereby the read-out signal from the energised winding of any one of said reading-out head structures resulting from an energising current pulse previously supplied to the energising winding of the related writing-in head structure of the same recording/reproducing head may be altered in its timing relative to said supervisory timing control.

14. A magnetic storage system according to claim 2 in which each of said separate current adjusting means comprises a tapped transformer.

15. A magnetic information storage device for an electronic binary digital computer according to claim 7 in which said current adjusting means intermediate said switching means and each of said higher impedance transformer windings comprises a plurality of tapping points on each of said higher impedance transformer windings for selective connectcion to said switching means.

References Cited in the file of this patent

UNITED STATES PATENTS

| | | |
|---|---|---|
| 2,537,770 | Livingston | Jan. 9, 1951 |
| 2,549,071 | Dusek | Apr. 17, 1951 |
| 2,563,882 | Stolaroff | Aug. 14, 1951 |
| 2,564,403 | May | Aug. 14, 1951 |
| 2,573,748 | Weinstein | Nov. 6, 1951 |
| 2,579,125 | Perreau | Dec. 18, 1951 |
| 2,583,983 | Arndb | Jan. 29, 1952 |
| 2,587,532 | Schmidt | Feb. 26, 1952 |
| 2,633,564 | Fleming | Mar. 31, 1953 |

FOREIGN PATENTS

| | | |
|---|---|---|
| 584,739 | Germany | Sept. 23, 1933 |

OTHER REFERENCES

Electronic Engineering, July 1949, "A Magnetic Digital Storage System" by A. D. Booth, pp. 234 to 238.

Publication, Proceedings of Institute of Electrical Engin., April. 1952, pp. 94–105, made available to the public Oct. 15, 1951.